United States Patent
Gielis et al.

(10) Patent No.: US 11,591,434 B2
(45) Date of Patent: *Feb. 28, 2023

(54) POLYMERS GRAFTED ONTO A METAL OXIDE SURFACE, METHOD OF GRAFTING POLYMERS ONTO A METAL OXIDE SURFACE, GRAFT POLYMER SUITABLE FOR THE METHOD

(71) Applicant: The Antenna Company International N.V., Curaçao (CW)

(72) Inventors: Johan Leo Alfons Gielis, Antwerp (BE); Maurizio Crippa, Milan (IT)

(73) Assignee: The Antenna Company International N.V., Curaçao (CW)

( * ) Notice: Subject to any disclaimer, the term of this patent is extended or adjusted under 35 U.S.C. 154(b) by 100 days.

This patent is subject to a terminal disclaimer.

(21) Appl. No.: 16/880,238

(22) Filed: May 21, 2020

(65) Prior Publication Data

US 2020/0277428 A1 Sep. 3, 2020

Related U.S. Application Data

(62) Division of application No. 15/579,274, filed as application No. PCT/NL2016/050393 on Jun. 2, 2016, now Pat. No. 10,696,773.

(30) Foreign Application Priority Data

Jun. 5, 2015 (NL) ...................................... 2014928

(51) Int. Cl.
 *C08F 292/00* (2006.01)
 *C08K 3/22* (2006.01)
 (Continued)

(52) U.S. Cl.
 CPC .............. *C08F 292/00* (2013.01); *C08K 3/22* (2013.01); *C08K 9/08* (2013.01); *C08L 51/10* (2013.01);
 (Continued)

(58) Field of Classification Search
 None
 See application file for complete search history.

(56) References Cited

U.S. PATENT DOCUMENTS 10,696,773 B2 * 6/2020 Gielis ..................... C08L 51/10
2015/0073109 A1 * 3/2015 Benicewicz .......... C07F 9/3808
560/147

FOREIGN PATENT DOCUMENTS

CN 101157745 A 4/2008
CN 103396503 A 11/2013

OTHER PUBLICATIONS

Basuki, J. S. et al., "Using Fluorescence Lifetime Imaging Microscopy to Monitor Theranostic Nanoparticle Uptake and Intracellular Doxorubicin Release". ACS Nano 2013, 7(11), 10175-10189. (Year: 2013).*

(Continued)

*Primary Examiner* — Richard A Huhn
(74) *Attorney, Agent, or Firm* — Renner, Otto, Boisselle & Sklar, LLP

(57) ABSTRACT

Metal oxide having a surface onto which a multitude of individual polymers are grafted, each polymer comprising an addition polymer having a first and a second end, and a first moiety comprising a terminal phosphonate group, which first moiety is bonded to the first end, which phosphonate group attaches to the metal oxide surface in such a way that the multitude of the grafted polymers comprises at least one group of adjacent polymers that have a stretched chain conformation wherein the adjacent stretched chains have a substantially parallel orientation, such that the poly- (Continued)

mers within said group together form a brush structure. Method of grafting a multitude of individual polymers onto a surface of a metal oxide.

18 Claims, 3 Drawing Sheets

(51) Int. Cl.
*C08L 101/00* (2006.01)
*C08K 9/08* (2006.01)
*C08L 51/10* (2006.01)
*C08L 101/02* (2006.01)
*C08F 32/06* (2006.01)
*C08F 112/08* (2006.01)
*C08F 120/06* (2006.01)
*C08F 120/44* (2006.01)

(52) U.S. Cl.
CPC ........... *C08L 101/00* (2013.01); *C08L 101/02* (2013.01); *C08F 32/06* (2013.01); *C08F 112/08* (2013.01); *C08F 120/06* (2013.01); *C08F 120/44* (2013.01); *C08F 2500/09* (2013.01); *C08K 2003/2241* (2013.01)

(56) References Cited

OTHER PUBLICATIONS

Boyer, C. et al., "The stabilization and bio-functionalization of iron oxide nanoparticles using heterotelechelic polymers". Journal of Materials Chemistry 2009, 19(1), 111-123. (Year: 2009).*

Crippa, M. et al., "High dielectric constant rutile-polystyrene composite with enhanced percolative threshold". J. Mater Chem. C, 2013, 1, 484-492. (Year: 2013).

* cited by examiner

POLYMERS GRAFTED ONTO A METAL OXIDE SURFACE, METHOD OF GRAFTING POLYMERS ONTO A METAL OXIDE SURFACE, GRAFT POLYMER SUITABLE FOR THE METHOD

This application is a divisional of U.S. application Ser. No. 15/579,274 filed Dec. 4, 2017, which is a national phase of International Application No. PCT/NL2016/050393 filed Jun. 2, 2016 and published in the English language, which claims priority to Dutch patent application no. NL 2014928 filed Jun. 5, 2015.

The present invention relates in a first aspect thereof, to a metal oxide having a surface onto which a multitude of individual polymers are grafted, each polymer comprising an addition polymer having a first and a second end, and a first moiety comprising a terminal attaching group, which first moiety is bonded to the first end, which terminal attaching group attaches to the metal oxide surface.

In a second aspect, the invention relates to a method of grafting polymers onto a metal oxide surface. In a third aspect, the invention relates to a graft polymer suitable for the above method.

In the art, it is well-known to graft polymers onto a metal oxide surface, in order to impart a functionalization on the metal oxide surface which is different than the character of the original metal oxide surface itself.

For instance, the strongly polar groups on the metal oxide surface may be shielded by grafted polymers having a substantially organic character, so that a surface is rendered with a substantially nonpolar character.

An essential requirement for a satisfactory shielding effect, is that the polymers are covering the metal oxide surface to such an extent that the original metal oxide surface is virtually not influencing the character of the outer layer anymore.

Basically, two methods are used to adhere polymers to a metal oxide surface: 'grafting onto' and 'grafting from'. The grafting onto technique involves the formation of the polymer first, and applying the polymer in solution onto the metal oxide surface and allowing a terminal attaching group of the polymer to attach to the surface.

The grafting from technique involves the formation of a pre-polymer containing a terminal attaching group, applying the pre-polymer in solution onto the metal oxide surface, and allowing the attaching group to attach to the surface. Subsequently a polymer is grown from the pre-polymer up to its desired length.

When using a terminal attaching group such as a carboxyl group, different results have been obtained when using the two different methods. The grafting onto technique uses pre-fabricated polymers, which in solution have the configuration of a random coil. During the attaching process to the metal oxide surface via the attaching group, the polymer chains remain in random coil configuration. In contrast, when using the grafting from technique it has been found that the distance between neighbouring grafted polymers is considerably smaller, and that the polymers grown from the attached pre-polymer have a stretched chain conformation, such that the polymers within said group together form a brush structure composed of parallel oriented, free tail ends of adjacent grafted polymers.

The brush structure is very attractive from a point of view of imparting a new functionality to the metal oxide surface, because it virtually completely shields off the original metal oxide surface. However, using the grafting from technique is more cumbersome and expensive than the grafting onto technique.

The objective of the present invention to develop a grafting onto process that is capable in achieving a brush structure of grafted polymers onto a metal oxide so that the imparted new functionality on the metal oxide is highly effective.

In the context of the present invention, the term 'grafted onto' thus also encompasses the expression 'obtained by grafting onto'.

In order to achieve the above objective, the invention relates to a metal oxide having a surface onto which a multitude of individual polymers are grafted, each polymer comprising an addition polymer having a first and a second end, and a first moiety comprising a terminal phosphonate group, which first moiety is bonded to the first end, which phosphonate group attaches to the metal oxide surface in such a way that the multitude of the grafted polymers comprises at least one group of adjacent polymers that have a stretched chain conformation wherein the adjacent stretched chains have a substantially parallel orientation, such that the polymers within said group together form a brush structure.

The invention uses phosphonate as a terminal attaching group of the graft polymer for accomplishing an attachment onto the metal oxide surface.

Using phosphonate as a terminal attaching group for a graft polymer has been described by Basuki et al. in *Macromolecules*, 46, 7043-7054, *ACS Publications* 2013, wherein super-paramagnetic iron oxide nanoparticles of 10 nm are grafted with a block copolymer. Between the free tail ends of the grafted polymers large intermediate spaces are present in which ionic dyes are to be encapsulated. These special nanoparticles are applied in biomedical research. Because of their relatively small size, the nanoparticles are to be regarded as small spheres which intrinsically are not suitable for the formation of a brush structure, as encompassed by the invention.

In particular, the metal oxide according to the invention includes the feature that the group of polymers forming a brush structure, are grafted onto a non-spherical metal oxide surface.

Such surfaces, in particular planar surfaces and the like, promote the stretched chain conformation because the free tail ends of adjacent grafted polymers have a limited distance to each other which is more or less equal to the distance between the attaching phosphonate groups.

The metal oxide according to the invention includes various metal types, such as titanium, iron, vanadium, cerium, tungsten, copper and antimony.

It is preferred that the metal oxide according to the invention includes the feature that the metal oxide is diamagnetic. This feature is advantageous in view of the intended applications of the grafted metal oxide surfaces, wherein it is in general to be avoided that the surfaces have a paramagnetic behaviour.

It is especially preferred that the metal oxide according to the invention is titanium dioxide.

According to a preferred embodiment of the metal oxide according to the invention, the group of polymers forming a brush structure, have an average distance D on the metal oxide surface between adjacent polymers, wherein D/2 is smaller than the average radius of gyration Rg of a random coil conformation of the individual grafted polymers.

It has been found that such values further promote the formation of stretched chains of grafted polymers.

Furthermore, it is preferred in the metal oxide according to the invention, that the the grafted polymers have a small polydispersity index (PDI) which is the ratio of the weight average molecular weight (Mw) and is the number average molecular weight (Mn), the PDI value being between 1 and 2, more preferably between 1 and 1.5.

Such grafted polymers have a more uniform size of the free tail ends, which enhances the quality of the obtained brush structure.

It is especially preferred in the metal oxide according to the invention, that each of the grafted polymers has a second moiety comprising a terminal aliphatic group, which second moiety is bonded to the second end via a thiocarbonylthio (—SC(=S)—) group, preferably via a tristhiocarbonate (—SC(=S)S—) group.

The above thio-groups are typical for a so-called RAFT reagent, which allows for a so-called reversible addition fragmentation chain transfer. The RAFT reagent acts as a pre-polymer molecule which allows the growth of a polymer chain next to the thio-group. Advantageously, the RAFT reagent is capable of controlling the extent of polymerization, so that a polymer chain is formed having a relatively low polydispersity.

Particularly preferred is that the terminal aliphatic group is a linear group chosen from n-butyl up to n-dodecyl.

It is furthermore preferred in the metal oxide according to the invention, that the addition polymer comprises a linear chain of carbon atoms, which preferably comprises 10 to 50 carbon atoms. Such length has been found to allow the addition polymer to adapt a stretched conformation, while being effective in imparting a new functionality to the metal oxide surface.

In the metal oxide according to the invention, preferably the addition polymer is a polystyrene, polyisoprene, polyacrylonitrile, polyacrylate, polymethacrylate, ABS, SAN, or a combination thereof.

ABS and SAN are copolymers of respectively acrylonitrile butadiene styrene, and styrene acrylonitrile.

Other suitable polymers that can be used as addition polymer in the invention are: polyethylene, polypropylene, polyvinyl chloride, polyvinyl acetate, acrylic polymers, polymethyl methacrylate, HEMA and cyanoacrylate polymers, polymethyl and polyethyl acrylates, fluorinated polymers such as polytetrafluoroethylene, fluoroelastomers, polyvinyl fluoride and polyvinylidene fluoride, diene polymers such as polybutadiene and polyisoprene, polychloroprene. Also combinations of any of the above polymers are included as embodiments of the addition polymer in the context of the invention.

It is preferred in the metal oxide according to the invention, that the phosphorus atom P of phosphonate group is bonded to the first end via a carboxylate group, preferably via a methylene carboxylate group (P—CH2-O(O=)C—).

In particular, it is preferred that the carboxylate group is bonded to the first end via a —C(CH3)(CH3)- group.

These types of covalent bonding of the phosphonate group to the first end of the polymer, were found to be successful in acquiring the desired effect of the invention.

In particular, it is preferred that the metal oxide according one to the invention is in the form of a particle, preferably in the range of 20 to 200 nm. This size was found to have sufficient surface area to permit the formation of brush structures of grafted polymers onto the surface.

This size is partly within the IUPAC definition of nanoparticles (up to 100 nm), but also includes sizes larger than nanoparticles.

Especially preferred is rutile—a TiO2 crystal—as a nanoparticle, which has a tetragonal, ditetragonal, dipyramidal crystal symmetry.

Another embodiment of the invention relates to a metal oxide according to the invention, wherein the metal oxide is in the form of a macroscopic sheet, such that the grafted polymers form a coating layer.

The polymers grafted onto the metal oxide surface thus provide a protective coating against any unwanted effects from the environment, including corrosion.

Furthermore, the polymers grafted onto the metal oxide surface may function as a primer layer to apply a paint layer upon. As such, the paint layer will adhere better than when applied directly onto the metal oxide surface without the presence of a grafted polymer layer.

In a special first aspect, the invention relates to a polymer material containing a polymer medium in which a multitude of metal oxides particles according to the above preferred embodiment are dispersed, and wherein preferably the polymer medium is compatible with the polymers grafted onto the metal oxides, or more preferably the polymer of the medium is the same as the polymer included in the grafted polymers.

A further preferred embodiment of the invention relates to a dielectric article comprising a polymer material according to the above special aspect, having a relative permittivity $\varepsilon_r$ of 3 or higher, preferably between 5 and 30, more preferably between 10 and 20.

Such dielectric articles have a substantially raised permittivity compared to the polymer medium itself, which is advantageous in terms of producing smaller dielectric articles for electronic equipment, including an antenna.

The dielectric article can for instance be produced by direct mixing of the particles with the polymer medium in a compounding machine, or alternatively by suspending the particles in a solution containing the polymer medium.

In a second aspect, the invention relates to a method of grafting a multitude of individual polymers onto a surface of a metal oxide, wherein each polymer comprises an addition polymer having a first and a second end, and a first moiety comprising a terminal phosphonate group, which first moiety is bonded to the first end, comprising the steps of:

dissolving the individual polymers in an appropriate solvent;

applying the formed solution onto the surface of the metal oxide;

allowing the individual polymers to attach to the surface, wherein the phosphonate group attaches to the metal oxide surface in such a way that the obtained multitude of grafted polymers onto the surface of the metal oxide comprises at least one group of adjacent polymers that have a stretched chain conformation wherein the adjacent stretched chains have a substantially parallel orientation, such that the polymers within said group together form a brush structure.

Subsequent to the attachment of the graft polymers onto the surface, the surface may be dried by allowing the solvent to evaporate. In the case of particles of metal oxide, the surface of the particles may be dried further in a centrifuge.

As explained above in respect of the first aspect of the invention, the known methods of grafting polymers onto metal oxide surfaces suffered from the drawback that the individual grafted polymers had a random coil conformation. Consequently, a brush structure of adjacent grafted polymers was not obtainable.

However, it was found that in using a terminal phosponate group on the individual polymers, which group attaches to the metal oxide surface, it was possible to achieve a stretched conformation of adjacent grafted polymers, wherein these polymers together form a brush structure.

Preferred embodiments of the method include the features which are already described above in view of the first aspect of the invention, and in particular relate to:
- the group of polymers that form a brush structure is being grafted onto a non-spherical metal oxide surface;
- the metal oxide used is diamagnetic, preferably titanium dioxide.

Preferably in the method according to the invention, the group of polymers forming a brush structure, have an average distance D on the metal oxide surface between adjacent polymers, wherein D/2 is smaller than the average radius of gyration Rg of a random coil conformation of the individual grafted polymers.

Further preferred embodiments of the method include the following independent features:
- the grafted polymers have a small polydispersity index (PDI) which is the ratio of the weight average molecular weight (Mw) and is the number average molecular weight (Mn), preferably the PDI is between 1 and 2, more preferably between 1 and 1.5;
- each of the grafted polymers has a second moiety comprising a terminal aliphatic group, which second moiety is bonded to the second end via a thiocarbonylthio (—SC(=S)—) group, preferably via a tristhiocarbonate (—SC(=S)S—) group;
- the addition polymer comprises a linear chain of carbon atoms, which preferably comprises 10 to 50 carbon atoms;
- the terminal aliphatic group is a linear alkyl group chosen from n-butyl up to n-dodecyl;
- the addition polymer is a polystyrene, polyisoprene, polyacrylonitrile, polyacrylate, polymethacrylate, ABS, SAN, or a combination thereof; other suitable polymers or mixtures thereof are already indicated above in respect of the first aspect of the invention, and are referred to.
- the phosphorus atom P of the phosphonate group is bonded to the first end via a carboxylate group, preferably via a methylene carboxylate group (P—CH2-O(O=)C—);
- the carboxylate group is bonded to the first end via a —C(CH3)(CH3)- group;
- the metal oxide is in the form of a nanoparticle, preferably in the range of 20 to 200 nm. Especially preferred is rutile as a nanoparticle (having a tetragonal, ditetragonal, dipyramidal crystal symmetry).

In a third aspect, the invention relates to a graft polymer suitable for grafting onto a metal oxide surface using the method according to the second aspect of the invention, wherein the polymer comprises a linear chain of polyethylene having a first and a second end, and a first moiety comprising a terminal phosphonate group, which first moiety is bonded to the first end, wherein the polymer has a second moiety comprising a terminal aliphatic group, which second moiety is bonded to the second end via a tristhiocarbonate (—SC(=S)S—) group, wherein the phosphorus atom P of the phosphonate group is bonded to the first end via a methylene carboxylate group (P—CH2-O(O=)C—), and preferably the carboxylate group is bonded to the first end via a —C(CH3)(CH3)- group.

This specific group of graft polymers was found to be suitable to be grafted onto particles of a size in the range of 20 to 200 nm, while obtaining at least one group of adjacent grafted polymers that have a stretched chain conformation, such that the polymers within said group together form a brush structure.

The terminal phosphonate group may be provided with leaving or protecting groups, e.g. in the form of a phosphonic acid or a bismethyl phosphonate.

Preferably, in the graft polymer according to the invention, the addition polymer comprises a linear chain of carbon atoms, which preferably comprises 10 to 50 carbon atoms.

A preferred graft polymer according to the invention includes the feature that the addition polymer is a polystyrene, polyisoprene, polyacrylonitrile, polyacrylate, polymethacrylate, ABS, SAN, or a combination thereof. Other suitable polymers or mixtures thereof are already indicated above in respect of the first aspect of the invention, and are referred to.

In particular it is preferred in the graft polymer according to the invention, that the terminal aliphatic group is a linear alkyl group chosen from n-butyl up to n-dodecyl.

EXAMPLE

The invention is further illustrated by the below example, together with appended drawings, wherein.

Figure 1:
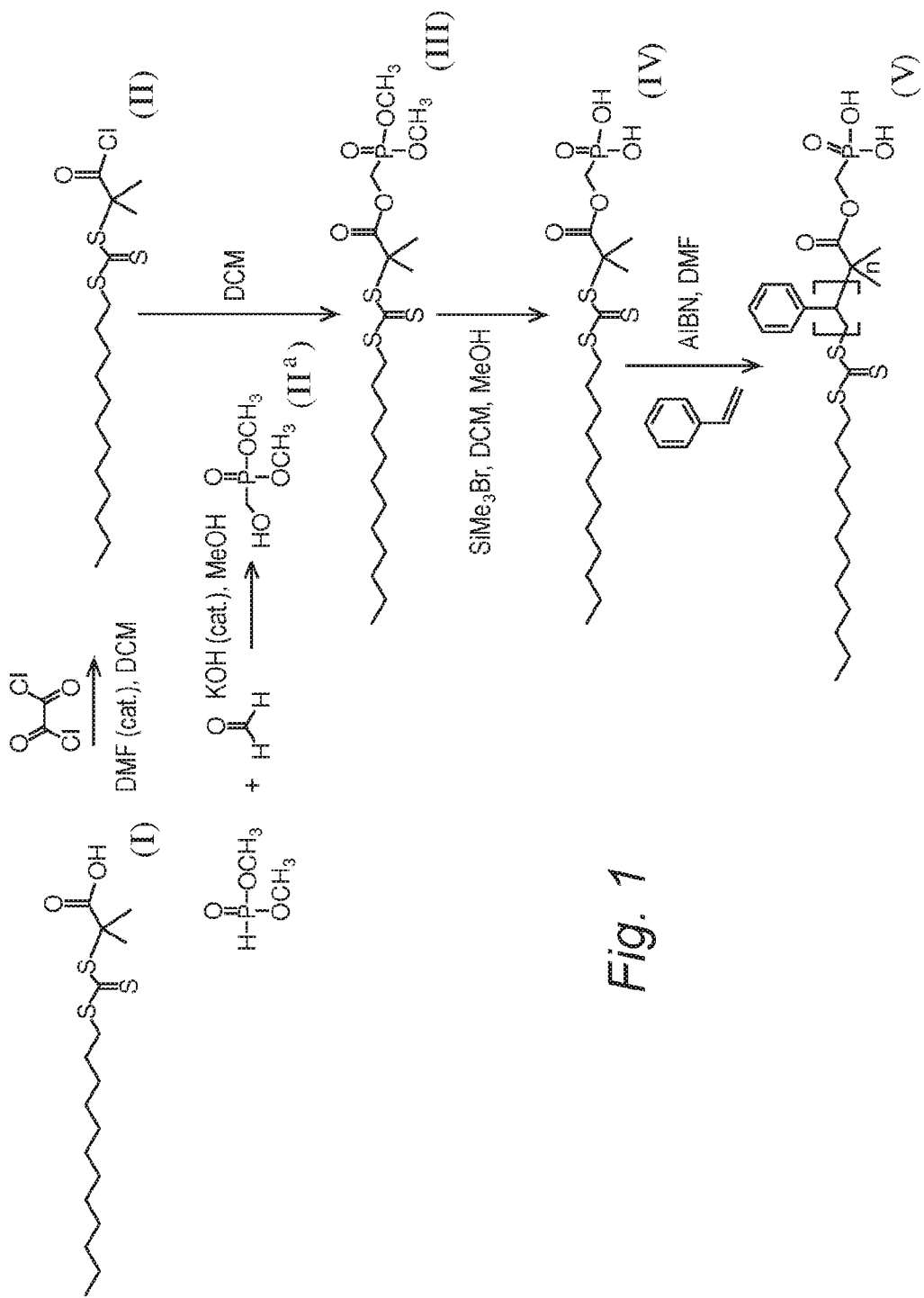
FIG. 1 shows a reaction scheme for producing a graft polymer according to the invention.

FIG. 1 shows a reaction scheme wherein a pre-polymer IV is prepared, which has the functionality of a RAFT reagent. The pre-polymer IV is allowed to react with styrene in AIBN and DMF, thus forming a polymer V, which is a graft polymer according to the invention. The graft polymer V was prepared in three batches with three different numbers of repeating styrene units, wherein n=18, 23 or 42. Pre-polymer IV is prepared by allowing compound I to react with oxalyl chloride in DMF and DCM, thus obtaining compound II. Compound II is reacted with a dimethyl phosphonate IIa to obtain compound III. Compound III is reacted in SiMe3Br, DCM, and MeOH, to obtain compound IV.

The graft polymer V (having n=18, 23 or 42) was dissolved in an appropriate solvent such as DMF and brought in a reactor containing rutile nanoparticles. The solution of graft polymer V was allowed to react with the rutile nanoparticles under ambient conditions for 24 hours. Subsequently the particles grafted with polymer V were separated by centrifuge and dried at 60° C. under reduced pressure.

Figure 2:
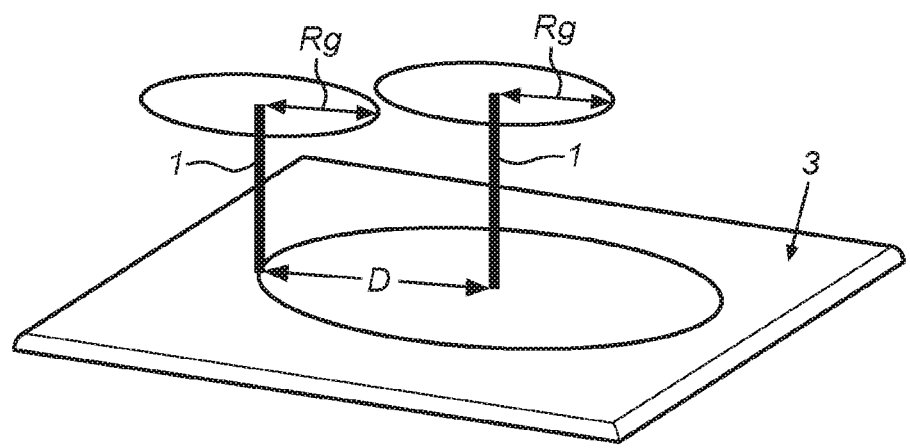
FIG. 2 shows schematically two adjacent grafted polymers attached to a flat metal oxide surface.

FIG. 2 shows schematically two adjacent graft polymers 1 that are attached to a flat titanium dioxide surface 3. The distance D on the titanium dioxide surface between the two adjacent graft polymers 1 is indicated, as well as the average radius of gyration Rg of a random coil conformation of the individual grafted polymers (the polymers are not visualized as a random coil, but simply as rods perpendicular to the surface). When D/2 is equal or larger than Rg, the conformation of a random coil is preferred for reasons of entropy.

Figure 3A:
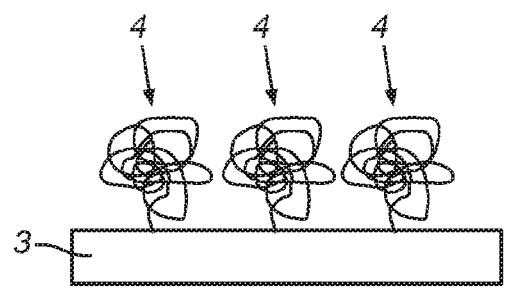
FIGS. 3a and 3b show two different conformations of two different polymers grafted onto a flat metal oxide surface.

FIG. 3a resp. 3b show two conformations of two different polymers 4, resp. 5, that are grafted onto a flat titanium dioxide surface 3. The polymers 4, resp. 5, were grafted onto the surface 3 by applying a solution of the respective polymers onto rutile nanoparticles according to above outlined procedure.

FIG. 3a shows three adjacent grafted polymers 4, which are almost equal to graft polymer V, with the exception that the terminal attaching group is not a phosphonate group but a carboxyl group instead. Each graft polymer 4 has 23 styrene units. The distance D between adjacent polymers is such that D/2 is larger than Rg (the average radius of gyration Rg of a random coil conformation).

From FIG. 3a it follows that when grafting onto a metal oxide a polymer having as a terminal attaching group a carboxyl group, a random coil conformation is achieved.

Figure 3B:
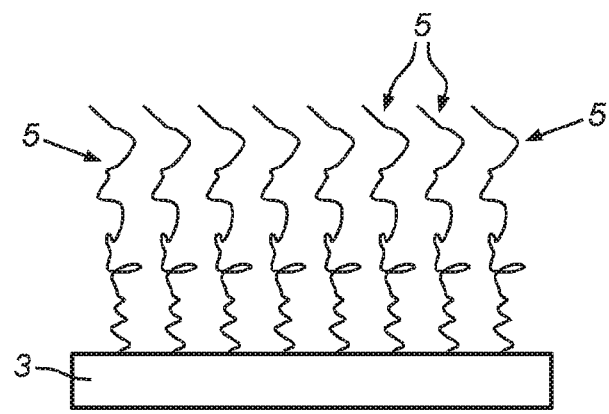

FIG. 3b shows eight adjacent grafted polymers 5, which are exactly equal to graft polymer V. Each graft polymer 5 has 23 styrene units. The distance D between adjacent polymers is such that D/2 is smaller than Rg (the average radius of gyration Rg of a random coil conformation).

FIG. 3b shows that when grafting onto a metal oxide a polymer having a phosphonate group as a terminal attaching group, a stretched chain conformation is achieved wherein the adjacent stretched chains have a substantially parallel orientation, such that the polymers within said group together form a brush structure.

The above qualitative difference is supported by the below measurement of the distance D between adjacent polymers grafted onto a flat titanium dioxide surface:

| Attaching group of graft polymer, number of styrene units | D/2 (nm) | Rg (nm) | Conformation of polymer chain |
|---|---|---|---|
| Carboxylate, 23 | 1.55 | 1.51 | Random coil |
| Phosphonate, 18 | 0.74 | 1.30 | Stretched chain |
| Phosphonate, 23 | 0.79 | 1.51 | Stretched chain |
| Phosphonate, 42 | 0.92 | 2.17 | Stretched chain |

From the above results, it follows that the graft polymer according to the invention allows for a grafting onto a metal oxide, wherein D/2 for adjacent polymers is substantially smaller than the Rg value of the individual polymers. Accordingly, the adjacent polymers are forced by their mutual steric hindrance to adopt a stretched chain conformation. Consequently, the adjacent graft polymers according to the invention together form a brush structure with the concomitant advantages such as a better shielding of the metal oxide surface.

Figure 4:
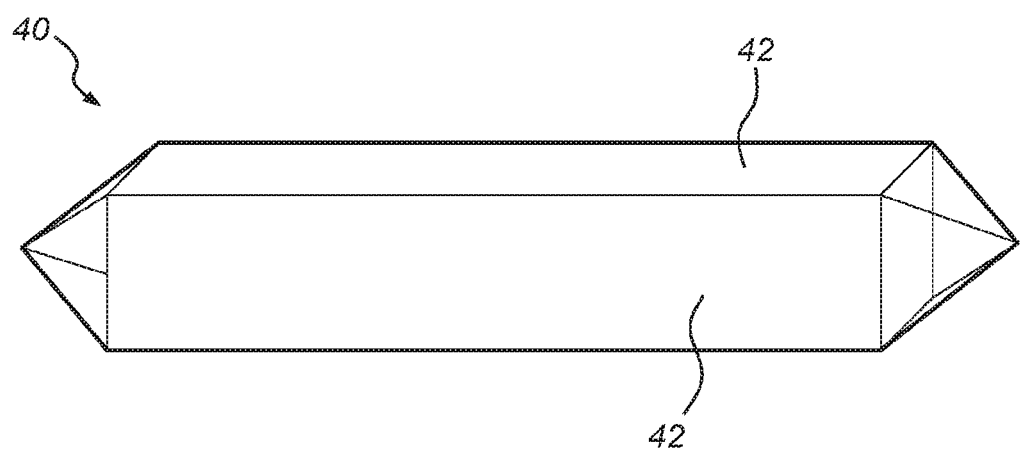
FIG. 4 shows a metal oxide particle of rutile that is preferably used in the invention.

FIG. 4 shows a metal oxide particle 40 of rutile, which is a type of TiO2 crystal that is preferably used in the invention. The length of the particle is approximately 140 to 180 nm. The width and height of the particle is approximately 30 to 35 nm. The larger flat surfaces 42 are especially suitable for grafting polymers onto according to the invention. When grafted onto surfaces 42, the free tail ends of adjacent grafted polymers have a limited distance to each other which forces them to adapt a stretched chain conformation, as long as the relationship is fulfilled that D/2 is smaller than Rg.

The invention claimed is:

1. Graft polymer suitable for grafting onto a metal oxide surface, wherein the polymer comprises an addition polymer having a first and a second end, and a first moiety comprising a terminal phosphonate group, which first moiety is bonded to the first end, and wherein the terminal phosphonate group is capable of accomplishing an attachment of the graft polymer onto the metal oxide surface, wherein the polymer has a second moiety comprising a terminal aliphatic group, which second moiety is bonded to the second end via a thiocarbonylthio (—SC(=S)—) group, wherein the terminal aliphatic group is a linear alkyl group chosen from n-butyl up to n-dodecyl, wherein the addition polymer is a polystyrene, polyisoprene, polyacrylonitrile, polymethacrylate, ABS, SAN, or a combination thereof.

2. Graft polymer according to claim 1, wherein the addition polymer comprises a linear chain of carbon atoms.

3. Graft polymer according to claim 1, wherein the phosphorus atom P of phosphonate group is bonded to the first end via a carboxylate group.

4. Graft polymer according to claim 3, wherein the carboxylate group is bonded to the first end via a —C(CH3)(CH3)- group.

5. Graft polymer according to claim 1, wherein the second moiety is bonded to the second end via a tristhiocarbonate (—SC(=S)S—) group.

6. Graft polymer according to claim 2, wherein the linear chain of carbon atoms comprises 10 to 50 carbon atoms.

7. Graft polymer according to claim 3, wherein the phosphorus atom P of phosphonate group is bonded to the first end via a methylene carboxylate group (P—CH2-O(O=)C—).

8. Method of grafting a multitude of individual graft polymers according to claim 1 onto a surface of a metal oxide,
comprising the steps of:
dissolving the individual graft polymers in an appropriate solvent;
applying the formed solution onto the surface of the metal oxide;
allowing the individual graft polymers to attach to the surface, wherein the phosphonate group attaches to the metal oxide surface during the method in such a way that the obtained multitude of grafted polymers onto the surface of the metal oxide comprises at least one group of adjacent polymers that have a stretched chain conformation wherein the adjacent stretched chains have a substantially parallel orientation, such that the adjacent polymers within said group together form a brush structure.

9. Method according to claim 8, wherein the graft polymers that are grafted onto the metal oxide surface, have a small polydispersity index (PDI) which is the ratio of the weight average molecular weight (Mw) and is the number average molecular weight (Mn), the PDI value being between 1 and 2.

10. Method according to claim 9, wherein the PDI value is between 1 and 1.5.

11. Method according to claim 8, wherein the group of polymers forming a brush structure, have an average distance D on the metal oxide surface between adjacent polymers, wherein D/2 is smaller than the average radius of gyration Rg of a random coil conformation of the individual grafted polymers.

12. Method according to claim 11, wherein D/2 is 70% of the average radius of gyration Rg or smaller.

13. Method according to claim 8, wherein the group of adjacent polymers forming a brush structure, are grafted onto a non-spherical metal oxide surface.

14. Method according to claim 8, wherein the metal oxide is diamagnetic.

15. Method according to claim 14, wherein the metal oxide is titanium dioxide.

16. Method according to claim 8, wherein the metal oxide is in the form of a particle in the range of 20 to 200 nm.

17. Method according to claim 16, wherein the metal oxide is a rutile nanoparticle.

18. Method according to claim 8, wherein the metal oxide is in the form of a macroscopic sheet, such that the grafted polymers form a coating layer.

* * * * *